(12) United States Patent
Hisha et al.

(10) Patent No.: US 8,323,448 B2
(45) Date of Patent: Dec. 4, 2012

(54) ADHESIVE COMPOSITION AND BONDING METHOD

(75) Inventors: Yuki Hisha, Shibukawa (JP); Kimihiko Yoda, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 320 days.

(21) Appl. No.: 12/679,058

(22) PCT Filed: Sep. 5, 2008

(86) PCT No.: PCT/JP2008/066103
§ 371 (c)(1),
(2), (4) Date: Mar. 19, 2010

(87) PCT Pub. No.: WO2009/041248
PCT Pub. Date: Apr. 2, 2009

(65) Prior Publication Data
US 2010/0236716 A1  Sep. 23, 2010

(30) Foreign Application Priority Data
Sep. 26, 2007  (JP) ................................. 2007-248324

(51) Int. Cl.
C04B 37/00 (2006.01)
C09J 4/00 (2006.01)
C09J 101/00 (2006.01)
C09J 201/00 (2006.01)
C08J 3/28 (2006.01)
B32B 7/12 (2006.01)
C08K 5/16 (2006.01)

(52) U.S. Cl. ..................... 156/325; 156/331.6; 522/113; 524/186

(58) Field of Classification Search ................. 156/325, 156/331.6; 522/113; 524/186
See application file for complete search history.

(56) References Cited

U.S. PATENT DOCUMENTS

| | | |
|---|---|---|
| 4,348,503 A | 9/1982 | Bachmann |
| 4,403,058 A | 9/1983 | Dohi et al. |
| 4,496,694 A | 1/1985 | Forgo et al. |
| 5,059,656 A * | 10/1991 | Tsuji ............................. 525/155 |
| 5,318,998 A * | 6/1994 | Taguchi et al. ................. 522/24 |
| 5,328,947 A * | 7/1994 | Taguchi et al. ............... 524/850 |

FOREIGN PATENT DOCUMENTS

| | | |
|---|---|---|
| EP | 0 492 521 A1 | 7/1992 |
| EP | 0 540 098 A1 | 5/1993 |
| EP | 1 698 664 A1 | 9/2006 |
| JP | 55 65277 | 5/1980 |
| JP | 58 196279 | 11/1983 |
| JP | 59 108069 | 6/1984 |
| JP | 60 199085 | 10/1985 |
| JP | 1 168777 | 7/1989 |
| JP | 2 681 | 1/1990 |
| JP | 3 134080 | 6/1991 |
| JP | 3 134081 | 6/1991 |
| JP | 4 46977 | 2/1992 |
| JP | 9 241585 | 9/1997 |
| JP | 2003 2915 | 1/2003 |
| JP | 2004 45511 | 2/2004 |
| WO | WO 91/05828 | 5/1991 |

OTHER PUBLICATIONS

"Acrylonitrile-Butadeine Rubber (NBR)", Jul. 31, 2007.*
Extended European Search Report issued on Mar. 7, 2012 in the corresponding European Patent Application No. 08833717.5.

* cited by examiner

Primary Examiner — Michael Orlando
(74) Attorney, Agent, or Firm — Oblon, Spivak, McClelland, Maier & Neustadt, L.L.P.

(57) ABSTRACT

A two-part type adhesive composition which comprises a first composition comprising (A) a nitrile butadiene rubber having an acrylonitrile content of from 10 to 30%, (B) a polymerizable (meth)acrylic liquid composition, (C) an organic peroxide and (D) a basic compound having an amine structure, and a second composition comprising (E) a reaction condensate of an amine and an aldehyde and (F) a reducing agent containing copper, is provided. In a preferred embodiment, the first composition also contains a photopolymerization initiator. A bonding method using the adhesive composition provides high adhesion and quick curing properties on the second time scale, and a high retention in durability on a high temperature and high humidity test.

14 Claims, No Drawings

ADHESIVE COMPOSITION AND BONDING METHOD

TECHNICAL FIELD

The present invention relates to an adhesive composition and a bonding method. More particularly, it relates to a two-part type high speed curable adhesive composition to be used for a metal member, a ceramic member and the like, and a bonding method using it.

BACKGROUND ART

Demands for an adhesive which is cured at room temperature in a short period of time are increasing from the viewpoint of an improvement in the production line efficiency and the cost reduction. Heretofore, well know as a room temperature quick curing adhesive are a two-part type quick curing epoxy adhesive, an instantaneous adhesive, an anaerobic adhesive, a non-anaerobic acrylic adhesive, etc.

A two-part type quick curing epoxy adhesive is used by weighing and mixing a main agent and a curing agent, and if weighing or mixing is not sufficiently carried out, the strength may remarkably be decreased. Further, even if weighing and mixing are sufficiently carried out, the peel strength and the impact strength tend to be low.

An instantaneous adhesive has excellent workability but has low peel strength and impact strength in general and is poor in the heat resistance and the moisture resistance, and accordingly the range of its use is remarkably limited.

An anaerobic adhesive is an adhesive which is cured by being pressure-bonded by materials to be bonded to shut off the air, and of course, a portion which is in contact with the air such as a running-over portion is not cured. Accordingly, in the case of a porous adherend or a high balance between adherends, it will not sufficiently be cured, thus leading to failure in adhesion.

A non-anaerobic acrylic adhesive is generally called a second-generation acrylic adhesive (SGA). Although it is two-part type, it has excellent workability such that no accurate weighing of two agents is required, and the adhesive is cured at room temperature in several minutes to several tens minutes by very rough weighing and mixing. In addition, it has high peel strength and impact strength, and a running-over portion is well cured. Thus, it has been widely used.

However, regarding an acrylic adhesive having a curing time of from several minutes to several tens minutes at room temperature, demands on one having a further shortened curing time are increasing from the viewpoint of an improvement in the production line efficiency and the cost reduction.

For example, an adhesive as disclosed in Patent Document 1 comprises an urethane acrylate, an acrylic ester monomer, an aromatic perester, an organic acid and a transition metal, and is cured in a set time of 45 seconds.

Further, an adhesive as disclosed in Patent Document 2 comprises a specific urethane acrylate, an acrylic ester monomer, a peroxyester and an accelerator made of a compound forming a redox system, and is also cured in a short set time within 1 minute.

An adhesive composition as disclosed in Patent Document 3 comprises a mixture of a chlorosulfonated polyethylene and a specific acrylic monomer in a specific proportion, cumene hydroperoxide, an aldehyde-amine condensate and an oxidizing organic compound of a transition metal, and is disclosed to be cured in a curing time of several seconds.

Patent Documents 4 and 5 disclose that a quick curing acrylic adhesive can be obtained by mixing a peroxyester, a reaction condensate of an amine and an aldehyde, a salt of copper and an aromatic hydroxy group-containing compound with an acrylic monomer.

Patent Document 1: U.S. Pat. No. 4,348,503
Patent Document 2: JP-A-60-199085
Patent Document 3: JP-A-55-065277
Patent Document 4: JP-A-03-134080
Patent Document 5: JP-A-03-134081

DISCLOSURE OF THE INVENTION

Object to be Accomplished by the Invention

However, all the adhesive compositions as disclosed in the above Patent Documents 1 to 5 have drawbacks such as a decrease in the strength under high temperature and high humidity conditions. Further, the adhesive compositions as disclosed in Patent Documents 4 and 5 have good initial adhesion, but have a drawback of a remarkable decrease in the strength under high temperature and high humidity conditions.

Further, the adhesive compositions as disclosed in the above Patent Documents 1 to 5 have drawbacks such that interfacial failure occurs with a metal steel plate, and no strong adhesion to an adherend can be obtained.

Under these circumstances, it is an object of the present invention to provide an adhesive composition having high adhesion and quick curing properties on the second time scale, and has a high retention even in a durability test such as a high temperature and high humidity test.

Means to Accomplish the Object

The present inventors have conducted extensive studies to accomplish the above object and as a result, found that the above object can be achieved by a two-part type composition which comprises a first agent mainly comprising a nitrile butadiene rubber having an acrylonitrile content of from 10 to 30%, a polymerizable (meth)acrylic composition, an organic peroxide and a basic compound having an amine structure, and a second agent mainly comprising a reaction condensate of an amine and an aldehyde, and a reducing agent containing copper; and a bonding method using the composition. The present invention has been accomplished on the basis of this discovery.

In the present invention, percent is based on mass unless otherwise specified.

The present invention provides the following.

1. A two-part type composition which comprises a first agent comprising (A) a nitrile butadiene rubber having an acrylonitrile content of from 10 to 30%, (B) a polymerizable (meth)acrylic composition, (C) an organic peroxide and (D) a basic compound having an amine structure, and a second agent comprising (E) a reaction condensate of an amine and an aldehyde and (F) a reducing agent containing copper.

2. A bonding method, which comprises using a first agent comprising (A) a nitrile butadiene rubber having an acrylonitrile content of from 10 to 30%, (B) a polymerizable (meth) acrylic composition, (C) an organic peroxide and (D) a basic compound having an amine structure, and a second agent comprising (E) a reaction condensate of an amine and an aldehyde, and (F) a reducing agent containing copper.

3. The bonding method according to the above 2, wherein the first agent is applied on one adherend, the second agent is applied on the other adherend, and adherend surfaces of them are brought into contact with each other.

4. The composition or the bonding method according to any one of the above 1 to 3, wherein the first agent contains a (G) a photopolymerization initiator.

5. The composition or the bonding method according to any one of the above 1 to 4, wherein the first agent contains a polymerization inhibitor.

6. The composition or the bonding method according to any one of the above 1 to 5, wherein the second agent contains (H) a solvent.

7. The composition or the bonding method according to any one of the above 1 to 6, wherein the component (B) contains isobornyl methacrylate.

8. The composition or the bonding method according to any one of the above 1 to 7, wherein the component (B) contains one or more members selected from the group consisting of isobornyl methacrylate, (meth)acrylic acid, 2,2-bis (4-methacryloxyethoxyphenyl)propane, 2,2-bis-[4-(methacryloxy polyethoxy)phenyl]propane and trimethylolpropane trimethacrylate.

9. The composition or the bonding method according to any one of the above 1 to 8, wherein the component (C) is cumene hydroperoxide or t-butyl peroxybenzoate.

10. The composition or the bonding method according to any one of the above 1 to 9, wherein the component (D) is a basic compound having a primary amine structure or a secondary amine structure.

11. The composition or the bonding method according to any one of the above 1 to 10, wherein the component (E) is aldehyde aniline.

12. An adhesive composition comprising the composition as defined in any one of the above 1 to 11.

13. A bonding method, using the adhesive composition as defined in the above 12.

14. A bonded assembly, made by using the adhesive composition as defined in the above 12.

Effects of the Invention

The composition of the present invention comprises a first agent comprising (A) a nitrile butadiene rubber having an acrylonitrile content of from 10 to 30%, (B) a polymerizable (meth)acrylic composition, (C) an organic peroxide and (D) a basic compound having an amine structure, and a second agent comprising (E) a reaction condensate of an amine and an aldehyde and (F) a reducing agent containing copper. An adhesive composition comprising the composition of the present invention has high adhesion and quick curing properties on the second time scale, and has a high retention in a durability test such as high temperature and high humidity test.

Further, by the bonding method using the composition of the present invention, reflecting the properties of the above composition, adherends can be bonded in an extremely short period of time, and for example, the bonding method can improve the productivity in a production line involving various types of bonding and can contribute to rationalization.

BEST MODE FOR CARRYING OUT THE INVENTION

Now, the present invention will be described in further detail below.

The component (A) contained in the first agent in the composition of the present invention is a nitrile butadiene rubber having an acrylonitrile content of from 10 to 30%, and is a component essential to exhibit a high retention in a durability test such as a high temperature and high humidity test.

The acrylonitrile content of the component (A) is from 10 to 30%, more preferably from 5 to 20%. If the acrylonitrile content is less than 10%, remarkable effects of the present invention will scarcely be obtained, and if it exceeds 30%, such may cause corrosion when a metal such as copper is to be bonded.

The content of the component (A) is preferably from 1 to 30 parts by mass, more preferably from 3 to 20 parts by mass per 100 parts by mass of the total amount of the components (A) and (B). If the content of the component (A) is at least 1 part by mass, the bond durability will not be decreased, and if it is at most 30 parts by mass, the viscosity of the adhesive will not be increased, and the adhesive will easily be handled.

The component (B) contained in the first agent is a polymerizable (meth)acrylic composition and is not particularly limited so long as it is radical polymerizable, and examples thereof are as follows. In the present invention, a (meth) acrylic composition means a methacrylic ester and/or an acrylic ester, and hereinafter sometimes referred to as a (meth)acrylate. For example, methyl(meth)acrylate, ethyl (meth)acrylate, propyl(meth)acrylate, butyl(meth)acrylate, 2-ethylhexyl(meth)acrylate, isooctyl(meth)acrylate, isodecyl (meth)acrylate, lauryl(meth)acrylate, stearyl(meth)acrylate, phenyl(meth)acrylate, cyclohexyl(meth)acrylate, dicyclopentenyl(meth)acrylate, dicyclopentenyl(meth)acrylate, isobornyl(meth)acrylate, methoxylated cyclotriene(meth) acrylate, dicyclopentenyloxyethyl(meth)acrylate, 2-hydroxyethyl(meth)acrylate, 2-hydroxypropyl(meth)acrylate, 3-hydroxypropyl(meth)acrylate, 4-hydroxybutyl(meth)acrylate, polyethylene glycol(meth)acrylate, alkyloxypolypropylene glycol(meth)acrylate, tetrahydrofurfuryl(meth)acrylate, 2-hydroxy-3-phenoxypropyl(meth)acrylate, glycidyl(meth) acrylate, caprolactone-modified tetrafurfuryl(meth)acrylate, ethoxycarbonylmethyl(meth)acrylate, phenol ethylene oxide-modified acrylate, p-cumylphenol ethylene oxide-modified acrylate, nonylphenol ethylene oxide-modified acrylate, nonylphenol polypropylene oxide-modified acrylate, 2-ethylhexyl carbitol acrylate, polyglycerol di(meth) acrylate, polybutylene glycol di(meth)acrylate, 1,4-butanediol(meth)acrylate, 1,6-hexanediol di(meth)acrylate, neopentyl glycol di(meth)acrylate, trimethylolpropane tri (meth)acrylate, epoxy(meth)acrylate ("VISCOAT #540" manufactured by OSAKA ORGANIC CHEMICAL INDUSTRY LTD.), polyester(meth)acrylate ("Aronix M-6100" manufactured by TOAGOSEI CO., LTD., "Epoxyester 3000M" manufactured by Kyoeisha Chemical Co., Ltd.), urethane acrylate ("Aronix M-1100" manufactured by TOAGOSEI CO., LTD.), polyethylene glycol urethane-modified di(meth)acrylate, polypropylene glycol urethane-modified di(meth)acrylate, epoxy acrylate ("Aronix M-5710" manufactured by TOAGOSEI CO., LTD.), polybutadiene dimethacrylate ("TE-2000" manufactured by Nippon Soda Co., Ltd.), acrylonitrile butadiene methacrylate ("HyCAr VTBNX" manufactured by Ube Industries Ltd.), benzyl (meth)acrylate, glycerol(meth)acrylate, glycerol di(meth) acrylate, phenoxydiethylene glycol(meth)acrylate, 2,2-bis(4-methacryloxyphenyl)propane, 2,2-bis(4-methacryloxydiethoxyphenyl)propane, 2,2-bis(4-methacryloxyethoxyphenyl)propane, 2,2-bis(4-methacryloxypropoxyphenyl)propane, 2,2-bis(4-methacryloxytetraethoxyphenyl)propane,2,2-bis[4-(methacryloxypolyethoxy)phenyl]propane, pentaerythritol tetra(meth)acrylate, dipentaerythritol hexa(meth)acrylate, toluene diisocyanate, 4,4-diphenylmethane diisocyanate, hexamethylene diisocyanate or isophorone diisocyanate may, for example, be mentioned.

As the component (B), one or more members may be used in the first agent, and preferred is isobornyl methacrylate. The component (B) is preferably one or more members selected from the group consisting of isobornyl methacrylate, (meth)acrylic acid, 2,2-bis(4-methacryloxyethoxyphenyl)propane, 2,2-bis[4-(methacryloxy polyethoxy)phenyl]propane and trimethylolpropane trimethacrylate.

In a case where isobornyl methacrylate, (meth)acrylic acid, 2,2-bis(4-methacryloxyethoxyphenyl)propane, 2,2-bis[4-(methacryloxy polyethoxy)phenyl]propane and trimethylolpropane trimethacrylate are used as the component (B), the proportion of isobornyl methacrylate:(meth)acrylic acid:2,2-bis(4-methacryloxyethoxyphenyl)propane:2,2-bis[4-(methacryloxy polyethoxy)phenyl]propane:trimethylolpropane trimethacrylate is preferably 10 to 70:1 to 40:0.1 to 10:5 to 45:0.1 to 10 (parts by mass), more preferably 20 to 60:5 to 20:1 to 5:10 to 35:1 to 5 (parts by mass) per 100 parts by mass of the total amount of isobornyl methacrylate, (meth)acrylic acid, 2,2-bis(4-methacryloxyethoxyphenyl)propane, 2,2-bis[4-(methacryloxy polyethoxy)phenyl]propane and trimethylolpropane trimethacrylate, whereby a high retention is achieved in a durability test such as a high temperature and high humidity test.

The content of the component (B) in the first agent is preferably from 70 to 99 parts by mass, more preferably from 80 to 97 parts by mass per 100 parts by mass of the total amount of the components (A) and (B). When it is at least 70 parts by mass, the viscosity will not be increased, and thus the composition is easily handled, and when it is at most 99 parts by mass, the bond durability will not be decreased.

The component (C) in the first agent is not particularly limited so long as it is an organic peroxide having a function as a polymerization initiator. It may, for example, be tert-butyl peroxybenzoate, tert-butyl oxyacetate, tert-butyl peroxyisobutyrate, tert-butyl peroxyphthalate or cumene hydroperoxide. Among them, most preferred are tert-butyl peroxybenzoate from the viewpoint of high speed curing, and cumene hydroperoxide from the viewpoint of high speed curing and storage stability.

The content of the component (C) in the first agent is preferably from 0.1 to 10 parts by mass, more preferably from 1 to 7 parts by mass per 100 parts by mass of the total amount of the components (A) and (B). When the content of the component (C) is at least 0.1 part by mass, high speed curing which is one of the objects of the present invention can be achieved, and when it is at most 10 parts by mass, the storage stability of the adhesive can sufficiently be secured.

The component (D) in the first agent is a basic compound having an amine structure and is not particularly limited so long as it assists high speed curing. Examples are as follows. Benzotriazole, phenothiazine, saccharin, 1-acetyl-2-phenylhydrazine, polyethyleneimine, modified polyethyleneimine (manufactured by NIPPON SHOKUBAI CO., LTD.), N,N-dimethylaniline, modified dihydropyridine, 2-methylimidazole, 2-hydroxyethyl p-toluidine, ethanolamine, diethanolamine, diethylethanolamine, methyldiethanolamine, butyldiethanolamine, diethylamine, triethylamine, n-butylamine, 2,2-bipyridine, 1,10-phenanthroline, ammonia, δ-iminomalonic ester, ethylazan, phenylamine, benzylamine, 1-benzofuran-2-amine, 4-quinolylamine, pentane-1,2,5-triamine, benzene-1,2,4,5-tetraamine, bis(2-chloroethyl)amine, butyl(ethyl)methylamine, (2-chloroethyl)(propyl)amine, hexan-1-imine, isopropylideneamine, ethane-1,2-diimine, carbodiimide, o-acetylhydroxylamine, o-carboxyhydroxylamine, hydroxylamine-o-sulfonic acid, o-hydroxyaniline, phenylpropanolamine hydrochloride, catecholamine, indolamine, polyacrylamine, dicyclohexylcarbodiimide, acetylthiourea, benzoylthiourea, 2-phenylhydrazine-1-carbaldehyde, 2,2,2-trifluoro-N'-phenylacetohydrazide, 1-crotonoyl-2-phenylhydrazine, 1-(2-carboxyacryloyl)-2-phenylhydrazine, 1-carbamoyl-2-phenylhydrazine, 1,4-diphenylthiosemicarbazide, 2,4-diphenylthiosemicarbazide, N,N'-diacetylthiourea, 2-thioxoimidazolidin-4-one, 1-acetyl-2-thiohydantoin, etc.

Among them, the component (D) is preferably a basic compound having a primary amine structure or a secondary amine structure. The basic compound having a primary amine structure or a secondary amine structure may be saccharin, benzotriazole or phenothiazine.

As the component (D), one or more members may be used, and phenothiazine or saccharin is preferred. The component (D) is preferably one or more members selected from the group consisting of phenothiazine, benzotriazole and saccharin. In a case where phenothiazine, benzotriazole and saccharin are used, the proportion of their use is preferably such that phenothiazine:benzotriazole:saccharin=2 to 45:15 to 95:3 to 80 (parts by mass), more preferably 5 to 15:70 to 80:15 to 25 (parts by mass) per 100 parts by mass of the total amount of phenothiazine, benzotriazole and saccharin, whereby solubility with the component (B) is high, and curing is very quickly accelerated, such being advantageous.

The content of the component (D) in the first agent is preferably from 0.1 to 10 parts by mass, more preferably from 0.5 to 5 parts by mass per 100 parts by mass of the total amount of the components (A) and (B). If the content of the component (D) is less than 0.5 part by mass, quick curing properties will not be obtained, and if it is at least 10 parts by mass, an uncured state may occur.

In the present invention, one comprising the components (A), (B), (C) and (D) is used as the first agent, and the first agent may contain a photopolymerization initiator to cure the running-over portion in addition, and may contain an additive (adhesion-imparting agent) to improve the adhesion to an adherend, and further contain an inorganic filler to impart rigidity and to reduce shrinkage on curing.

As the above photopolymerization initiator (G), benzophenone, 4-phenylbenzophenone, benzyl, benzoin, benzoyl isopropyl ether, benzoyl benzoate, 2,2-diethoxyacetophenone, bisdiethylaminobenzophenone, benzyl dimethyl ketal, 1-hydroxycyclohexyl phenyl ketone, thioxanthone, 1-(4-isopropylphenyl)2-hydroxy-2-methylpropan-1-one, 1-(4-(2-hydroxyethoxy)-phenyl-2-methyl-1-propan-1-one, 2-hydroxy-2-methyl-1-phenylpropan-1-one, camphorquinone, 2,4,6-trimethylbenzoyl diphenylphosphine oxide, bis(2,4,6-trimethylbenzoyl)-phenylphosphine oxide, 2-methyl-1-(4-(methylthio)phenyl)-2-morpholinopropan-1-one, 2-benzyl-2-dimethylamino-1-(4-morpholinophenyl)-1-butan-1-one or bis(2,6-dimethoxybenzoyl)-2,4,4-trimethyl-pentylphosphine oxide may, for example, be mentioned.

The content of the component (G) in the first agent is preferably from 0.01 to 10 parts by mass, more preferably from 0.1 to 5 parts by mass per 100 parts by mass of the total amount of the components (A) and (B). When the content of the component (G) is at least 0.01 part by mass, curing occurs by light, and when it is at most 10 parts by mass, the adhesive strength will not be decreased.

The adhesion-imparting agent in the first agent may, for example, be γ-chloropropyltrimethoxysilane, vinyl trimethoxysilane, vinyl trichlorosilane, vinyl triethoxysilane, vinyl-tris(β-methoxyethoxy)silane, γ-methacryloxypropyltrimethoxysilane, γ-acryloxypropyltrimethoxysilane, β-(3,4- epoxycyclohexyl)ethyltrimethoxysilane, γ-glycidoxypropyl-trimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropyl-methyldimethoxysilane, γ-ureidopropyltriethoxysilane, hydroxyethyl methacrylate phosphate, methacryloxyethyl acid phosphate, or methacryloxyethyl acid phosphate monoethylamine half salt. From the viewpoint of the adhesion to a metal adherend, particularly preferred is methacryloxyoxyethyl acid phosphate or methacryloxyoxyethyl acid phosphate monoethylamine half salt.

The amount of use of the adhesion-imparting agent in the first agent is preferably from 0.1 to 5 parts by mass, more preferably from 0.5 to 3 parts by mass per 100 parts by mass of the total amount of the components (A) and (B). When the amount of use of the adhesion-imparting agent is at least 0.1 part by mass, an improvement in the adhesion will be confirmed, and when it is at most 5 parts by mass, the storage stability will not be decreased.

The inorganic filler in the first agent may, for example, be quartz, quartz glass, molten silica, a silica powder such as spherical silica, an oxide such as spherical alumina, crushed alumina, magnesium oxide, beryllium oxide or titanium oxide, a nitride such as boron nitride, silicon nitride or aluminum nitride, a carbide such as silicon carbide, a hydroxide such as aluminum hydroxide or magnesium hydroxide, a metal such as copper, silver, iron, aluminum, nickel or titanium or an alloy of such a metal, or a carbon filler such as diamond or carbon. One or more of such inorganic fillers may be used.

Now, the components (E) and (F) constituting the second agent in the composition of the present invention will be described.

The component (E) in the second agent is a reaction condensate of an amine and an aldehyde. The reaction condensate of an amine and an aldehyde may, for example, be an amine composite mixture obtained by reacting 1 mol of an amine with at least 1 mol, preferably from 1.5 to 3 mols of an aldehyde at from 40 to 70° C. in the presence of an organic carboxylic acid such as propionic acid or an inorganic acid such as phosphoric acid or acetic acid.

Further, as another example of the reaction condensate of an amine and an aldehyde, specifically, a reaction condensate of butylamine or aniline with butyl aldehyde or aldehyde aniline, etc. may be mentioned.

The content of the component (E) is preferably at least 0.05 wt %, more preferably from 0.1 to 90 mass %, most preferably from 0.5 to 50 mass %. When the content of the component (E) is at least 0.1 mass %, high speed curing will be confirmed, and when it is at most 90 mass %, no uncured portion will be occurred.

The component (F) in the second agent is a reducing agent containing copper, and it may, for example, be copper acetate, copper naphthenate, copper octylate, an acetyl acetone copper complex, copper sulfate or copper oxide.

As the component (F), with a view to forming a more stable copper catalyst by the coexistence with the component (E), particularly, copper naphthenate or copper octylate is preferably selected.

The content of the component (F) is preferably at least 0.0001 mass %, more preferably from 0.0005 to 1 mass %, most preferably from 0.005 to 0.7 mass % based on the entire second agent. When the content of the component (F) is at least 0.0005 mass %, quick curing will be confirmed, and when it is at most 1 mass %, the adhesion will not be decreased.

The second agent is preferably a liquid, and an excellent action as a curing accelerator will be achieved when the components (E) and (F) are dissolved or dispersed in a solvent to form the second agent. As a solvent suitable for such use, a volatile organic solvent is preferred. The volatile organic solvent is preferably one having a boiling point of from 35 to 110° C., particularly preferably from 45 to 70° C. The volatile solvent having a boiling point of from 35 to 110° C. may, for example, be acetone, methanol, ethanol, butanol, isopropyl alcohol, ethyl acetate, toluene, methylene chloride, trichloroethane, tetrahydrofuran, hexane, diethyl ether, benzene or chloroform.

The amount of use of the solvent is preferably from 0.1 to 98 mass %, more preferably from 10 to 95 mass %, most preferably from 50 to 90 mass % based on the entire second agent.

The first agent in the composition of the present invention may contain an elastomer. The elastomer may, for example, be an elastomer such as an acrylic rubber or an urethane rubber; a methyl methacrylate/butadiene/styrene graft copolymer (a butadiene/MMA/ST copolymer); or a graft copolymer such as an acrylonitrile/butadiene/styrene graft copolymer.

The content of the elastomer in the first agent is preferably from 0.1 to 95 parts by mass, more preferably from 5 to 75 parts by mass, furthermore preferably from 10 to 25 parts by mass per 100 parts by mass of the total amount of the components (A) and (B). If the content of the elastomer is at least 0.1 part by mass, curing properties will not be deteriorated, and when it is at most 95 parts by mass, the viscosity will not be increased, whereby the composition will easily be handled.

The first agent in the composition of the present invention may contain a polymerization inhibitor so as to improve the storage stability. The polymerization inhibitor may, for example, be 1,3,5-trimethyl-2,4,6-tris(3,5-di-t-butyl-4-hydroxybenzyl)benzene, methylhydroquinone, hydroquinone, 2,2-methylene-bis(4-methyl-6-tert-butylphenol), catechol, hydroquinone monomethyl ether, mono-tert-butylhydroquinone, 2,5-di-tert-butylhydroquinone, p-benzoquinone, 2,5-diphenyl-p-benzoquinone, 2,5-di-tert-butyl-p-benzoquinone, picric acid, citric acid, phenothiazine, tert-butyl catechol, 2-butyl-4-hydroxyanisole or 2,6-di-tert-butyl-p-cresol.

The content of the polymerization inhibitor in the first agent is preferably from 0.001 to 5 parts by mass, more preferably from 0.1 to 3 parts by mass per 100 parts by mass of the total amount of the components (A) and (B).

The adhesive composition of the present invention may contain additives such as an elastomer such as an acrylic rubber or an urethane rubber, a graft copolymer such as a methyl methacrylate/butadiene/styrene graft copolymer or an acrylonitrile/butadiene/styrene graft copolymer, an extender, a reinforcing material, a plasticizer, a thickener, a dye, a pigment, a flame retardant and a surfactant, within a range not to impair the object of the present invention. Such additives may be added to the first agent and/or the second agent constituting the composition of the present invention, or may be added to the composition of the present invention.

In the composition of the present invention, the first agent is preferably a liquid, and the second agent is also preferably a liquid. The viscosity of the first agent and the second agent is preferably from 1,000 to 20,000 mPa·s, particularly preferably from 8,000 to 13,000 mPa·s. The adhesive composition of the present invention is quickly cured in a short period of time by blending the first agent and the second agent into contact with each other.

In a case where two adherends are bonded by using the adhesive composition of the present invention, since the curing rate is high, preferred is such a method that the first agent is applied to one adherend, the second agent is applied to the other adherend, and when the second agent contains a volatile solvent, it is volatilized, and then coated surfaces of the adherends are bonded. In this method, if there is a running-over portion or the like at which the first agent and the second agent are not contacted, by addition of a photopolymerization initiator in the first agent, the running-over portion can be cured by irradiation with ultraviolet rays.

By the bonding method of the present invention, reflecting the properties of the adhesive composition, adherends can be bonded in an extremely short period of time, and the bonding method can improve the productivity in various production lines and can contribute to rationalization.

The composition of the present invention and the bonded assembly bonded by the bonding method using the composition are characterized in that they have a high retention even after a durability test such as a high temperature and high humidity test, reflecting the properties of the adhesive composition.

EXAMPLES

Now, the present invention will be described in further detail with reference to Examples and Comparative Examples. However, it should be understood that the present invention is by no means restricted to such specific Examples.

Examples 1 to 4 and Comparative Examples 1 to 7

As shown in Table 1, components (A) to (D) and other additives in an amount not to impair the object of the present invention were mixed in a ratio as identified in Table 1, and further an elastomer was added for viscosity adjustment to prepare a first agent.

n-Butylaldehyde aniline as the component (E), copper naphthenate (copper concentration: 5%) as the component (F) and acetone as a diluent were mixed in a ratio as identified in Table 1 to prepare a second agent. n-Butylaldehyde aniline is a reaction condensate of n-butyl aldehyde and aniline.

n-Butylaldehyde aniline is obtained by reacting 1 mol of aniline with 2 mol of n-butyl aldehyde at 60° C. in the presence of an acid.

In Table 1, the amounts of the respective components for the first agent and the second agent are represented by part(s) by mass. Further, in Table 1, AN represents acrylonitrile, NBR a nitrile butadiene rubber, MMA methyl methacrylate and ST styrene.

The bonding time of the adhesive composition comprising the first agent and the second agent and the tensile shear strength of a cured product were measured by the following methods.

(Measurement of Bonding Time)

The first agent was applied on one of test specimens for measuring the tensile shear strength (a plate having a length of 100 mm, a width of 25 mm and a thickness of 1.6 mm), the second agent was applied to the other test specimen, the volatile solvent in the second agent was volatilized, and the coated surfaces of the adherends were bonded, and a time until which they were not separated even when a load of 4 kg was applied, was regarded as the bonding time.

(Tensile Shear Strength)

As adherends, iron test specimens (sandbrusted) in the form of a plate having a length of 100 mm, a width of 25 mm and a thickness of 1.6 mm were bonded by the above methods, and the tensile shear strength was measured by a tensile tester (pulling rate: 10 mm/min).

(Evaluation of Moisture Resistance)

Using the above test specimens for measuring the tensile shear strength, the same bonded product as for evaluation of the tensile shear strength was prepared and left to stand in an atmosphere at a temperature of 60° C. under a humidity of 90% for 500 hours. Then, it was taken out and left to stand in a room in an atmosphere of 23° C.×50% RH (relative humidity) for 30 minutes or more, and the tensile shear strength was measured.

(Viscosity)

It was measured in accordance with JIS K-6838. A sample (first agent) was adjusted to have a liquid temperature of 25° C. and stirred for 2 minutes by a Brookfield viscometer (rotor No. 5, number of revolutions: 20 rpm), and the viscosity was calculated from the scale of a pointer.

The results of the above measurement are shown in Table 1.

TABLE 1

| | Component | | Ex. 1 | Ex. 2 | Ex. 3 | Ex. 4 | Comp. Ex. 1 | Comp. Ex. 2 |
|---|---|---|---|---|---|---|---|---|
| First agent | A | AN content 15% NBR | 6.1 | 6.1 | 6.1 | 6.1 | — | 6.1 |
| | | AN content 41% NBR | — | — | — | — | 6.1 | — |
| | B | Isobornyl methacrylate | 46.3 | 46.3 | 46.3 | 46.3 | 46.3 | 46.3 |
| | | Methacrylic acid | 10.0 | 10.0 | 10.0 | 7.5 | 10.0 | 10.0 |
| | | 2,2-Bis-[4-(methacryloxyethoxy)phenyl]propane | 3.3 | 3.3 | 3.3 | 3.3 | 3.3 | 3.3 |
| | | 2,2-bis-[4-(methacryloxy polyethoxy)phenyl]propane | 23.5 | 23.5 | 23.5 | 23.5 | 23.5 | 23.5 |
| | | 2-Hydroxyethyl methacrylate | — | — | — | — | — | — |
| | | Dicyclopentenyloxyethyl methacrylate | | | | | | |
| | | Trimethylolpropane trimethacrylate | 3.3 | 3.3 | 3.3 | 3.3 | 3.3 | 3.3 |
| | C | t-Butyl peroxybenzoate | 5.0 | 5.0 | — | — | 5.0 | — |
| | | Cumene hydroperoxide | — | — | 5.0 | 5.0 | — | — |
| | D | Phenothiazine | 0.2 | 0.2 | 0.2 | 0.2 | 0.2 | 0.2 |
| | | Benzotriazole | 2 | 2 | 2 | 2 | 2 | 2 |
| | | Saccharin | 0.5 | 0.5 | 0.5 | 0.5 | 0.5 | 0.5 |
| | G | Benzyl dimethyl ketal | — | — | — | — | — | 1.0 |
| | Additive | (2-Hydroxyethyl)methacrylic acid phosphate | 1.5 | 1.5 | 1.5 | 1.5 | 1.5 | 1.5 |
| | | 1,3,5-Trimethyl-2,4,6-tris(3,5-di-t-butyl-4-hydroxybenzyl)benzene | 0.5 | 0.5 | 0.5 | 0.5 | 0.5 | 0.5 |
| | Others | Butadiene/MMA/ST copolymer | 15.0 | — | 15.0 | 15.0 | 15.0 | 15.0 |
| Second | E | n-Butylaldehyde aniline | 12.5 | 12.5 | 12.5 | 12.5 | 12.5 | 12.5 |

TABLE 1-continued

| | Component | | Comp. Ex. 3 | Comp. Ex. 4 | Comp. Ex. 5 | Comp. Ex. 6 | Ex. 5 |
|---|---|---|---|---|---|---|---|
| | agent | F | Copper naphthenate (copper content: 5%) | 0.5 | 0.5 | 0.5 | 0.5 | 0.5 | 0.5 |
| | Others | | Acetone | 90.0 | 90.0 | 90.0 | 90.0 | 90.0 | 90.0 |
| Bonding time | | | | At most 10 seconds | At most 10 seconds | At most 10 seconds | 15 seconds | At most 10 seconds | Uncured |
| Tensile shear strength | | | | 21 MPa | 21 MPa | 21 MPa | 19 MPa | 21 MPa | Uncured |
| Tensile shear strength (moisture resistance) | | | | 20 MPa | 20 MPa | 20 MPa | 18 MPa | 10 MPa | Uncured |
| Viscosity (mPa·s) | | | | 10000 | 10000 | 10000 | 10000 | 10000 | 10000 |

| | | Component | Comp. Ex. 3 | Comp. Ex. 4 | Comp. Ex. 5 | Comp. Ex. 6 | Ex. 5 |
|---|---|---|---|---|---|---|---|
| First agent | A | AN content 15% NBR | 6.1 | 6.1 | 6.1 | — | 6.1 |
| | | AN content 41% NBR | — | — | — | — | — |
| | B | Isobornyl methacrylate | 46.3 | 46.3 | 46.3 | — | — |
| | | Methacrylic acid | 10.0 | 10.0 | 10.0 | — | 10.0 |
| | | 2,2-Bis-[4-(methacryloxyethoxy)phenyl]propane | 3.3 | 3.3 | 3.3 | — | 3.3 |
| | | 2,2-bis-[4-(methacryloxy polyethoxy)phenyl]propane | 23.5 | 23.5 | 23.5 | — | 23.5 |
| | | 2-Hydroxyethyl methacrylate | — | — | — | 40.0 | — |
| | | Dicyclopentenyloxyethyl methacrylate | — | — | — | 10 | — |
| | | Trimethylolpropane trimethacrylate | 3.3 | 3.3 | 3.3 | — | 3.3 |
| | C | t-Butyl peroxybenzoate | 5.0 | 5.0 | 5.0 | 5.0 | 5.0 |
| | | Cumene hydroperoxide | — | — | — | — | — |
| | D | Phenothiazine | — | 0.2 | 0.2 | 0.2 | 0.2 |
| | | Benzotriazole | — | 2 | 2 | 2 | 2 |
| | | Saccharin | — | 0.5 | 0.5 | 0.5 | 0.5 |
| | G | Benzyl dimethyl ketal | — | — | — | — | — |
| | Additive | (2-Hydroxyethyl)methacrylic acid phosphate | 1.5 | 1.5 | 1.5 | 1.5 | 1.5 |
| | | 1,3,5-Trimethyl-2,4,6-tris(3,5-di-t-butyl-4-hydroxybenzyl)benzene | 0.5 | 0.5 | 0.5 | 0.5 | 0.5 |
| | Others | Butadiene/MMA/ST copolymer | 15.0 | 15.0 | 15.0 | — | 15.0 |
| Second agent | E | n-Butylaldehyde aniline | 12.5 | — | 12.5 | 12.5 | 12.5 |
| | F | Copper naphthenate (copper content: 5%) | 0.5 | 0.5 | — | 0.5 | 0.5 |
| | Others | Acetone | 90.0 | 90.0 | 90.0 | 90.0 | 90.0 |
| Bonding time | | | 30 seconds | At least 2 hours | Uncured | 30 seconds | At most 10 seconds |
| Tensile shear strength | | | 21 MPa | 14 MPa | Uncured | 18 MPa | 21 MPa |
| Tensile shear strength (moisture resistance) | | | 20 MPa | 14 MPa | Uncured | 9 MPa | 13 MPa |
| Viscosity (mPa·s) | | | 10000 | 10000 | 10000 | 2000 | 15000 |

Example 6 and Comparative Example 7

With respect to a bonded assembly obtained by bonding copper plates using each of the adhesive compositions in Example 1 and Comparative Example 1, a corrosion test with copper plate was carried out in a sealed glass container. No change was observed on copper plates bonded by using the adhesive composition in Example 1 (Example 6), whereas surface oxidation was observed on copper plates bonded by using the adhesive composition in Comparative Example 1 (Comparative Example 7).

Example 7

To the first agent of the adhesive composition in Example 1, 1 part of benzyl dimethyl ketal as a photopolymerization initiator was added and dissolved to prepare a composition. On a surface to be bonded of an iron test specimen for measuring the tensile shear strength, the second agent in Example 1 was applied so as not to run over, and the above composition was applied to the other test specimen, and the test specimens were bonded so that the composition run over. The running-over portion was irradiated with ultraviolet rays, whereupon tack completely disappeared on the surface of a cured product when touched by a finger.

Industrial Applicability

The adhesive composition of the present invention and the bonding method using it are industrially highly useful since when applied to various production lines, the production time reduction or rationalization is possible, since the curing reaction at room temperature is very quick, and the composition is excellent in adhesion and moisture resistance.

The entire disclosure of Japanese Patent Application No. 2007-248324 filed on Sep. 26, 2007 including specification, claims, drawings and summary is incorporated herein by reference in its entirety.

The invention claimed is:

1. A two-part adhesive composition, comprising:
   a first composition, comprising:
   (A) a nitrile butadiene rubber having an acrylonitrile content of from 10 to 30%;
   (B) a polymerizable (meth)acrylic monomer composition;
   (C) an organic peroxide; and
   (D) at least one basic compound selected from the group consisting of phenothiazine, benzotriazole and saccharin; and
   a second composition, comprising:
   (E) a reaction condensate of an amine and an aldehyde; and
   (F) a reducing agent containing copper.

2. The composition according to claim 1, wherein the first composition further comprises (G) a photopolymerization initiator.

3. The composition according to claim 1, wherein the first composition further comprises an elastomer.

4. The composition according to claim 1, wherein the first composition further comprises a polymerization inhibitor.

5. The composition according to claim 1, wherein the second composition further comprises (H) a solvent.

6. The composition according to claim 1, wherein the component (B) comprises isobornyl methacrylate.

7. The composition according to claim 1, wherein the component (B) comprises one or more members selected from the group consisting of isobornyl methacrylate, (meth)acrylic acid, 2,2-bis(4-methacryloxyethoxyphenyl)propane, 2,2-bis-[4-(methacryloxy polyethoxy)phenyl]propane and trimethylolpropane trimethacrylate.

8. The composition according to claim 1, wherein the component (C) is cumene hydroperoxide or t-butyl peroxybenzoate.

9. The composition according to claim 1, wherein the component (E) is aldehyde aniline.

10. An adhesive composition comprising the composition as defined in claim 1.

11. A bonding method, comprising application of the adhesive composition as defined in claim 10.

12. A bonded assembly, wherein the bonding comprises the adhesive composition as defined in claim 10.

13. A bonding method, which comprises:
applying to a substrate a two-part type composition which comprises a first composition comprising (A) a nitrile butadiene rubber having an acrylonitrile content of from 10 to 30%, (B) a polymerizable (meth)acrylic composition, (C) an organic peroxide and (D) at least one basic compound selected from the group consisting of phenothiazine, benzotriazole and saccharin, and a second composition comprising (E) a reaction condensate of an amine and an aldehyde, and (F) a reducing agent containing copper.

14. The bonding method according to claim 13, wherein the first composition is applied on one adherend, the second agent is applied on the other adherend, and adherend surfaces of them are brought into contact with each other.

* * * * *